June 12, 1962  D. W. CROOKE  3,038,760
FISH LADDER
Filed Nov. 6, 1959  3 Sheets-Sheet 1
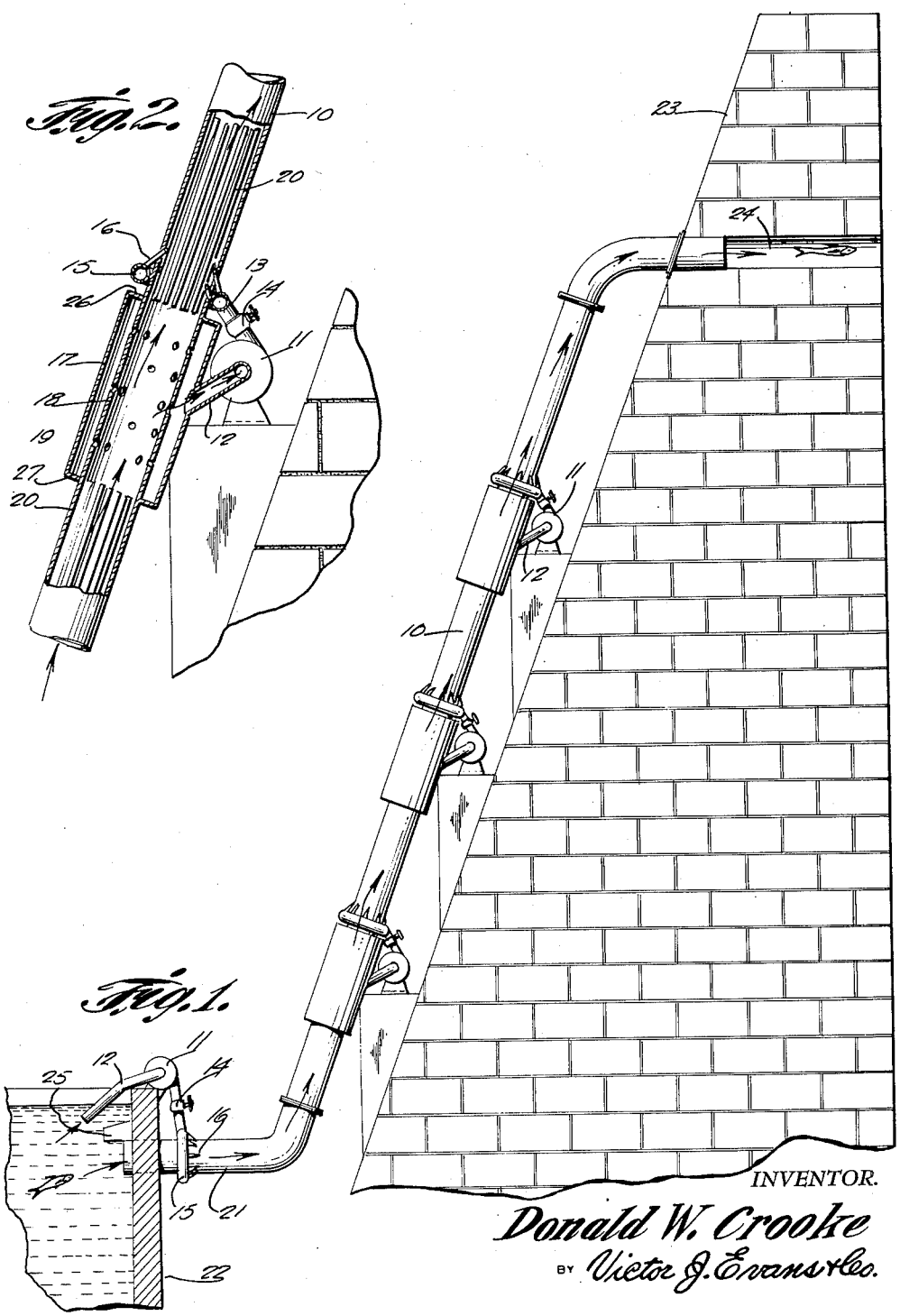
INVENTOR.
Donald W. Crooke
BY Victor J. Evans & Co.
ATTORNEYS

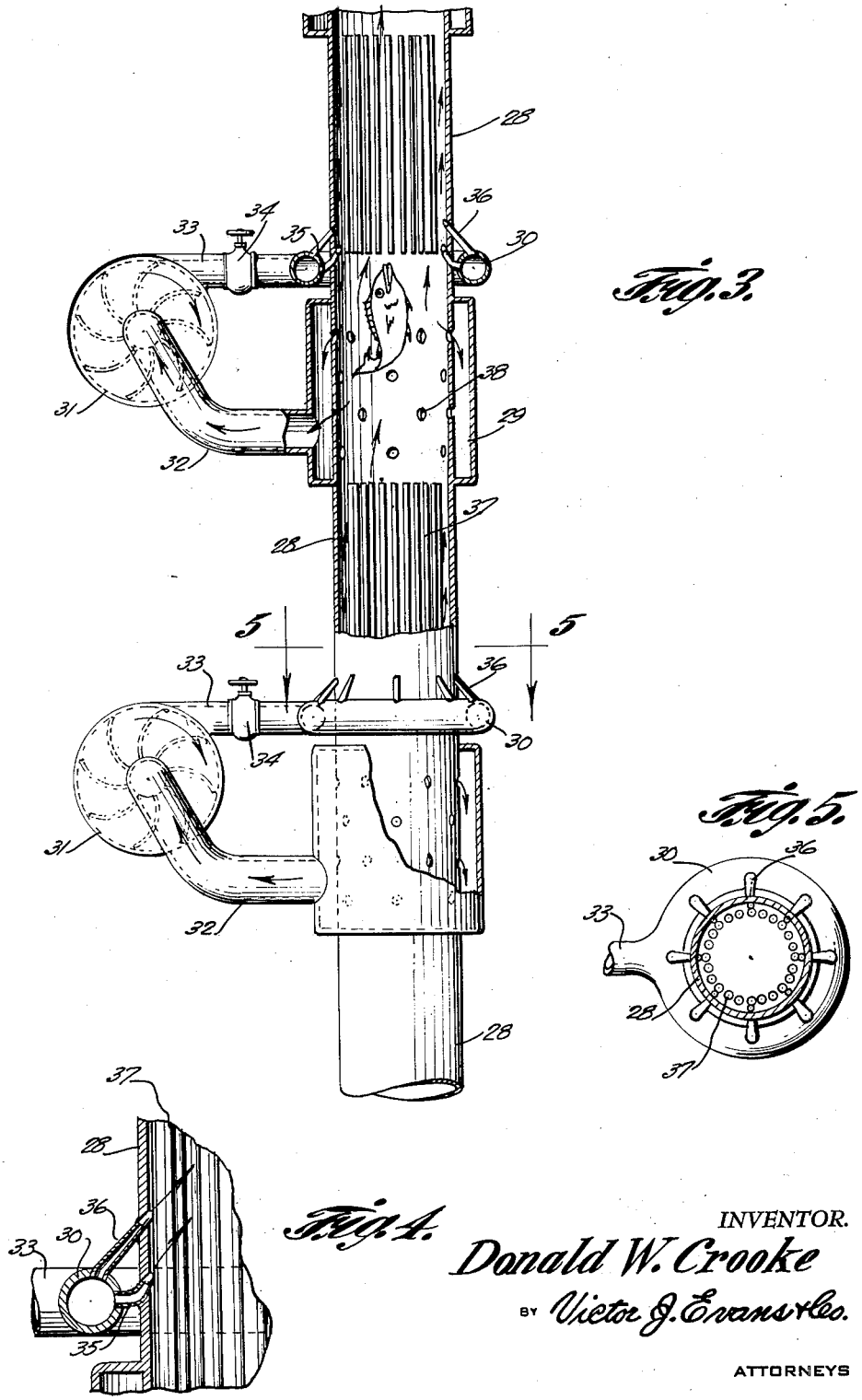

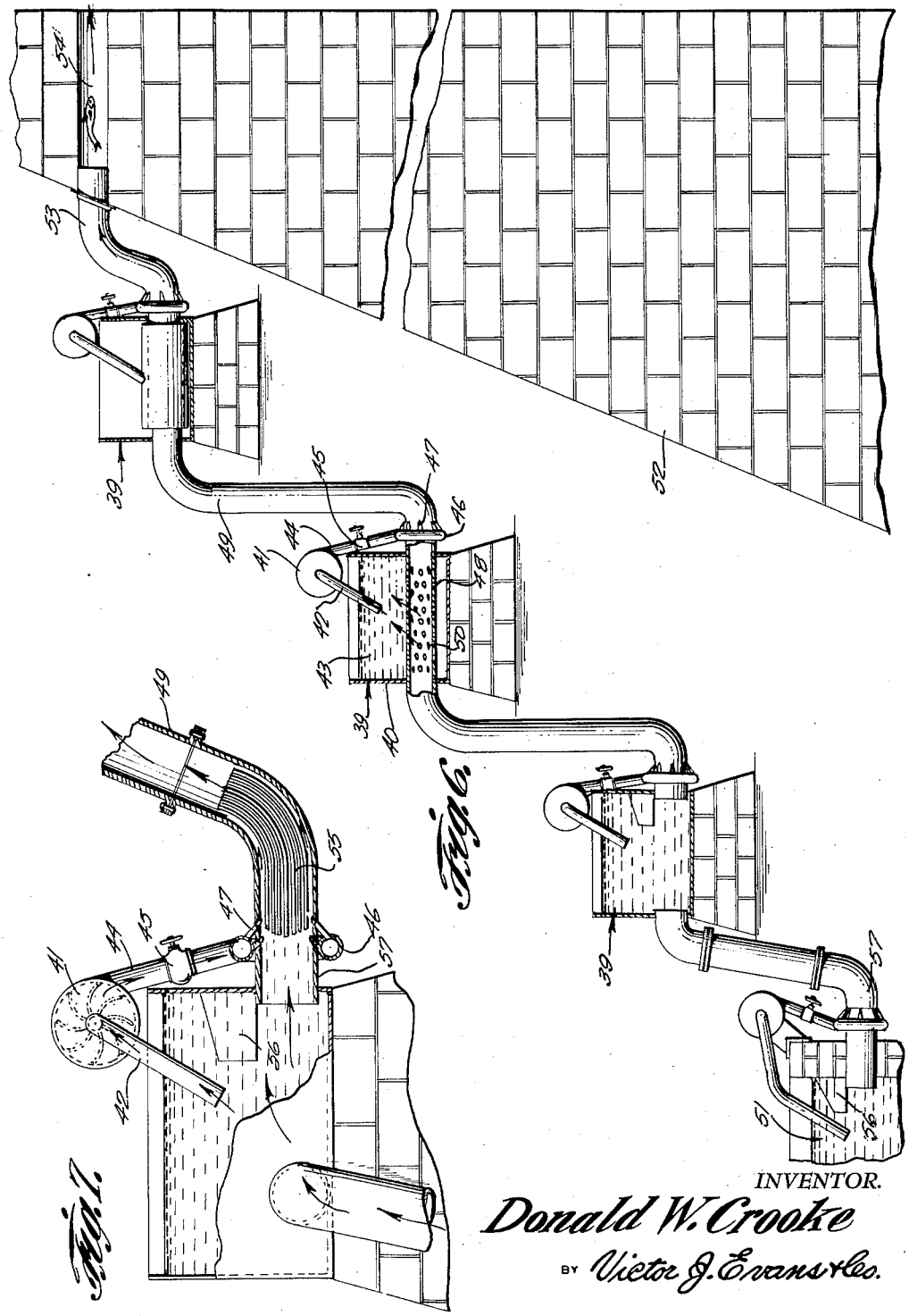

United States Patent Office 3,038,760
Patented June 12, 1962

3,038,760
FISH LADDER
Donald W. Crooke, 1115 4th St., Nampa, Idaho
Filed Nov. 6, 1959, Ser. No. 851,410
2 Claims. (Cl. 302—14)

This invention relates to fish ways for assisting fish in navigating dams, falls, and the like, and in particular a plurality of jets positioned in stages and extended around pipes for maintaining a continuous supply of water from lower to upper ends of dams whereby migratory fish are provided with a continuous body of water in traveling over dams, falls, and the like.

The purpose of this invention is to provide a fish way in which sufficient buoyancy is supplied by jets to assist fish in navigating relatively high dams, falls, and the like.

Various types of fish ways have been provided for assisting fish in navigating dams and the like. However, in fish ways of the present construction water is forced into the lower end under pressure or withdrawn from the upper end by suction and owing to the limitation of the head of water the height of such fish ways is limited. With this thought in mind this invention contemplates supplying water through a ring of jets in spaced stages throughout the height of a dam or the like whereby a continuous stream of water is forced upwardly through a duct or the like whereby fish are not only supplied with a continuous stream of water but are also urged upwardly throughout a plurality of stages of a fish way.

The object of this invention is to provide means for maintaining a supply of water in a vertically disposed fish way so that fish may travel over relatively high dams and the like.

Another object of the invention is to provide a fish way having a plurality of vertically spaced stages so that the supply of water is not broken by the head limitation of water between the stages.

Another important object of the invention is to provide an elongated vertically disposed fish way in which water is supplied to the fish way at different stages in which fish traveling through the fish way are prevented from coming in direct contact with the water supplying means.

A further object of the invention is to provide a fish way for assisting fish in navigating a dam or the like in which water under pressure is supplied in stages to insure continuous buoyancy throughout the height of the fishway in which the fishway is of simple and economical construction.

With these and other objects and advantages in view the invention embodies an elongated vertically disposed pipe or casing having rings of jets positioned in stages with pumps for withdrawing water from the fishway and discharging the water under pressure back into the fishway to provide a continuous upwardly traveling body of water throughout the height of the fishway.

Other features and advantages of the invention will appear from the following description taken in connection with the drawings, wherein:

FIGURE 1 is a side elevational view showing the improved fishway in combination with a dam and in which fluid injecting jets are provided at spaced intervals on the conduit of the fish way.

FIGURE 2 is a longitudinal section in a portion of the fishway with the parts shown on an enlarged scale and showing a single unit or one of the stages of the fishway.

FIGURE 3 is a longitudinal section through a single stage of a fishway with an adjoining stage shown in elevation, showing a modification wherein the fishway is vertically positioned.

FIGURE 4 is a longitudinal section showing a portion of a stage of a jet assembly of a stage with the parts shown on an enlarged scale and with parts broken away.

FIGURE 5 is a sectional plan through the fishway illustrated in FIGURE 3 being taken on line 5—5 thereof.

FIGURE 6 is a side elevational view, with parts broken away and with parts shown in section illustrating a further modification wherein the fishway includes a plurality of horizontally disposed units connected by vertically disposed pipes and in which water is withdrawn from the horizontally disposed portions and injected into lower ends of the vertically disposed sections for driving water upwardly from one unit to another.

FIGURE 7 is a longitudinal section through the discharge side of one of the units illustrated in FIGURE 6 showing the nozzle or jet assembly and with the parts shown on an enlarged scale.

Referring now to the drawings wherein like reference characters denote corresponding parts the improved fish ladder of this invention, as illustrated in FIGURES 1 and 2, includes a pipe 10, pumps 11 having intake connections 12 and discharge connections 13 with valves 14 in the discharge connections, the discharge connections extending from the pumps to tubular rings 15 around the pipe 10 and having nozzles 16 extended therefrom, and the intake connections 12 being connected to sleeves 17 positioned around sections 18 of the pipe 10, and in which perforations 19 are provided, and rings of rods 20 in the pipe 10 and positioned over the ends of the jets or nozzles to prevent fish coming in contact with the nozzles, the rods being spaced from the inner surface of the pipe or tube 10 and secured, such as by welding, to the inner surface of the pipe.

In the design illustrated in FIGURES 1 and 2 the pipe 10 is provided with a horizontally disposed lower end 21 which extends into a basin or reservoir 22 at the bottom of a dam 23 and the upper end extends into a passage 24 extended through the dam and opening into water on the upper side of the dam. The inner surface of the basin 22 is provided with a projection 25 extended over the inner end of the end or section 21 of the pipe or tube.

With the pumps or turbines 11 operating and with the valve 14 open water under pressure is injected into the pipe or tube 10 at a plurality of stages and the distance between the stages is such that the water will not separate and whereby the water will provide a continuous body from the basin to the upper part of the dam. The sleeves 17 provide water jackets around the pipe and the ends 26 and 27 may be integral with the sleeves and may be secured to the pipe by welding or the like.

The design illustrated in FIGURES 3, 4 and 5 is similar to that shown in FIGURES 1 and 2 except that the duct is vertical instead of being positioned on an incline; and in this design a pipe 28, provided with water jackets 29 and nozzle holding rings 30 is provided with turbines or pumps 31 having suction connections 32 extended to the water jackets 19 and discharge connections 33 extended to the rings 30. The connections 33 are provided with valves 34 and the rings 30 are provided with nozzles 35 and 36. The pipe is provided with spaced rods 37 that extend over the nozzles and portions of the pipe within the sleeves or water jackets 29 are provided with perforations 38.

In the design illustrated in FIGURES 6 and 7 the fishway or ladder extends through a plurality of stages 39 including tanks 40 with pumps 41 in combination therewith and suction connections 42 of the pumps extend into water 43 in the tanks with discharge connections 44 from the pumps, and having valve 45 therein connected to rings 46 having nozzles 47 extended therefrom and extended through walls of the sections of the pipe, similar to the nozzles 16 shown in FIGURE 2.

However, valve sections 48 of the pipe or conduit 49 are provided with perforations 50 that open into the tank 39 whereby water from the conduit passes into the tank and is drawn into the pumps or turbines 41 by which the water is discharged under pressure through the nozzles into the vertically disposed sections of the conduits.

The conduit extends from a basin or reservoir 51 below a dam 52, through the different stages, and is extended with an upper end 53 through a passage 54 in the upper part of the dam. The sections of the conduit 49 in which the nozzles 47 are positioned are provided with rings of rods 55 that are spaced from the inner surface of the conduit and that protect fish from engagement with the nozzles. The basin or reservoir 51 is also provided with a projecting ledge 56 that extends over the intake end of the conduit.

By this means fish entering the lower end 57 of the conduit travel upwardly through the different stages and may swim outwardly through the upper end 53 and the opening 54 into water above the dam.

According to the present invention there is provided a machine or apparatus for controlling the flow of water at any desired speed and for controlling the pressure on any height dam. A hydraulic principle is utilized which will insure that the pressure will be the same in all of the stages.

It will be understood that other modifications, within the scope of the appended claims, may be made in the design and arrangement of the parts without departing from the spirit of the invention.

What is claimed is:

1. In a fishway, the combination which comprises a conduit extended from a basin to an elevated point, a plurality of stages in said conduit, the walls of the conduit being perforated in said stages, a water retainer extended around the conduit in each of said stages, a plurality of upwardly disposed nozzles in each of said stages, pumps for withdrawing water from the water retainer and discharging the water through said nozzles, and means in the conduit for preventing engagement of fish traveling through the conduit with the nozzles.

2. In a fishway, the combination which comprises a water supply, a conduit extended upwardly from said water supply and said conduit extending upwardly to an elevation above the water supply, said conduit having a plurality of spaced stages therein, each of said stages including a water retainer, the wall of the conduit being perforated in the water retainer of each stage, a ring of injectors extended through the wall of the conduit at the upper end of each stage, pumps in each stage mounted to withdraw water from said water retainer and for supplying the water under pressure to said injectors, and rings of rods mounted upon and spaced from the inner surface of the conduit and positioned over the injectors.

References Cited in the file of this patent

UNITED STATES PATENTS

| | | |
|---|---|---|
| 1,232,393 | Piper | July 3, 1917 |
| 1,380,384 | Howard | June 7, 1921 |
| 1,465,269 | Horn et al. | Aug. 21, 1923 |
| 1,722,596 | Ross | July 30, 1929 |
| 2,191,424 | Cardinal | Feb. 20, 1940 |
| 2,683,969 | Mugnier | July 20, 1954 |
| 2,910,833 | Pancheri | Nov. 3, 1959 |

FOREIGN PATENTS

| | | |
|---|---|---|
| 373,182 | Germany | Apr. 9, 1923 |
| 1,099,520 | France | Mar. 23, 1955 |